United States Patent [19]

Smolik

[11] Patent Number: 4,599,485
[45] Date of Patent: Jul. 8, 1986

[54] ELECTRICAL RECEPTACLE BOX ASSEMBLY

[76] Inventor: Robert A. Smolik, 670 W. Seventh St., St. Paul, Minn. 55102

[21] Appl. No.: 684,695

[22] Filed: Dec. 21, 1984

[51] Int. Cl.⁴ .............................................. H02G 3/10
[52] U.S. Cl. ....................................... 174/57; 220/3.7
[58] Field of Search ................. 174/53, 57; 220/3.2, 220/3.3, 3.4, 3.5, 3.6, 3.7, 3.92, 3.94

[56] References Cited

U.S. PATENT DOCUMENTS

| | | | |
|---|---|---|---|
| 1,557,066 | 10/1925 | Krantz | 220/3.94 X |
| 1,933,358 | 10/1933 | Almcrantz | 220/3.6 X |
| 1,964,535 | 6/1934 | Schreiber | 174/57 X |
| 2,808,172 | 10/1957 | Buckels | 220/3.4 |
| 2,881,940 | 4/1959 | Hamilton | 220/3.94 |
| 3,185,760 | 5/1965 | Despard | 174/57 X |
| 4,306,109 | 12/1981 | Nattel | 220/3.2 X |

FOREIGN PATENT DOCUMENTS

| | | | |
|---|---|---|---|
| 0154189 | 11/1953 | Australia | 174/57 |
| 0078637 | 10/1933 | Sweden | 174/57 |

*Primary Examiner*—Arthur T. Grimley
*Assistant Examiner*—D. A. Tone
*Attorney, Agent, or Firm*—Burd, Bartz & Gutenkauf

[57] ABSTRACT

An electrical receptacle box assembly including an electrical receptacle box and a removable cover with a frame offset from the front of the box for offset mounting of electrical receptacles with respect to the box to accommodate wall covering around the box. The frame includes positionally adjustable mounting brackets with mounting faces that are movable in order to compensate for irregularities in the mounting of the electrical receptacle box so that the electrical receptacle can finally be mounted flush with respect to the wall covering.

16 Claims, 10 Drawing Figures

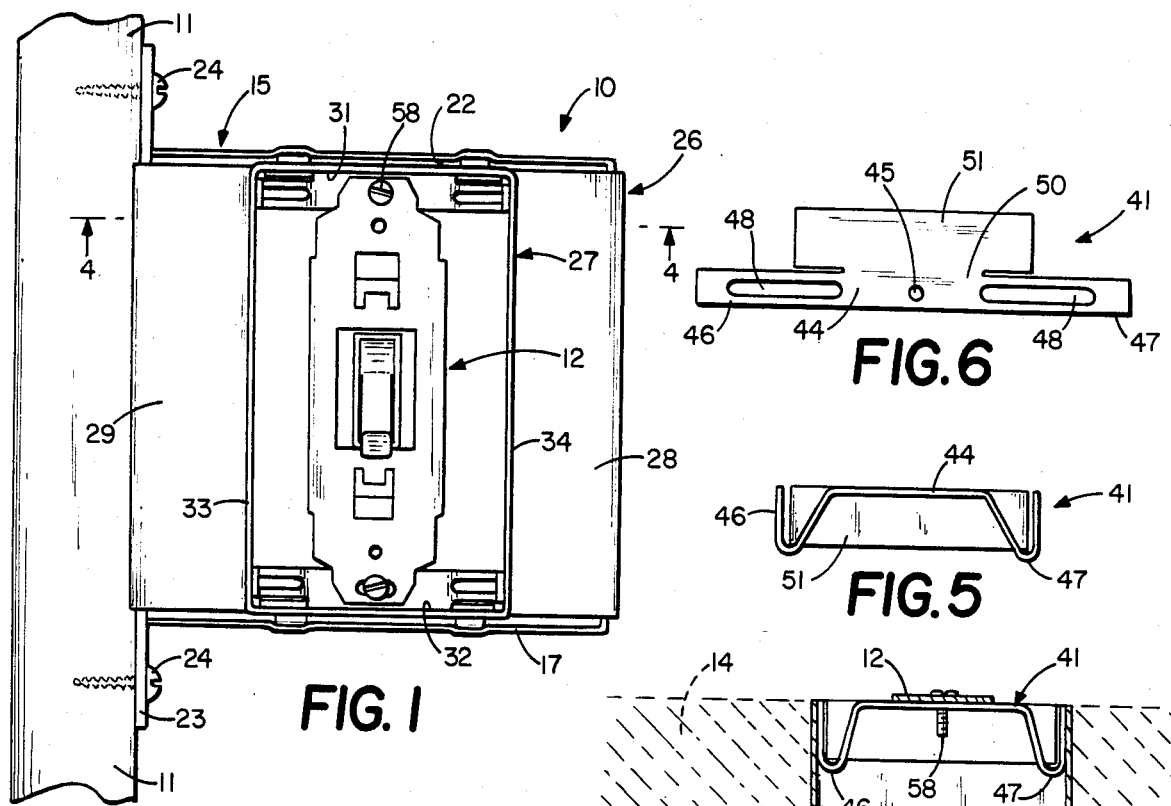
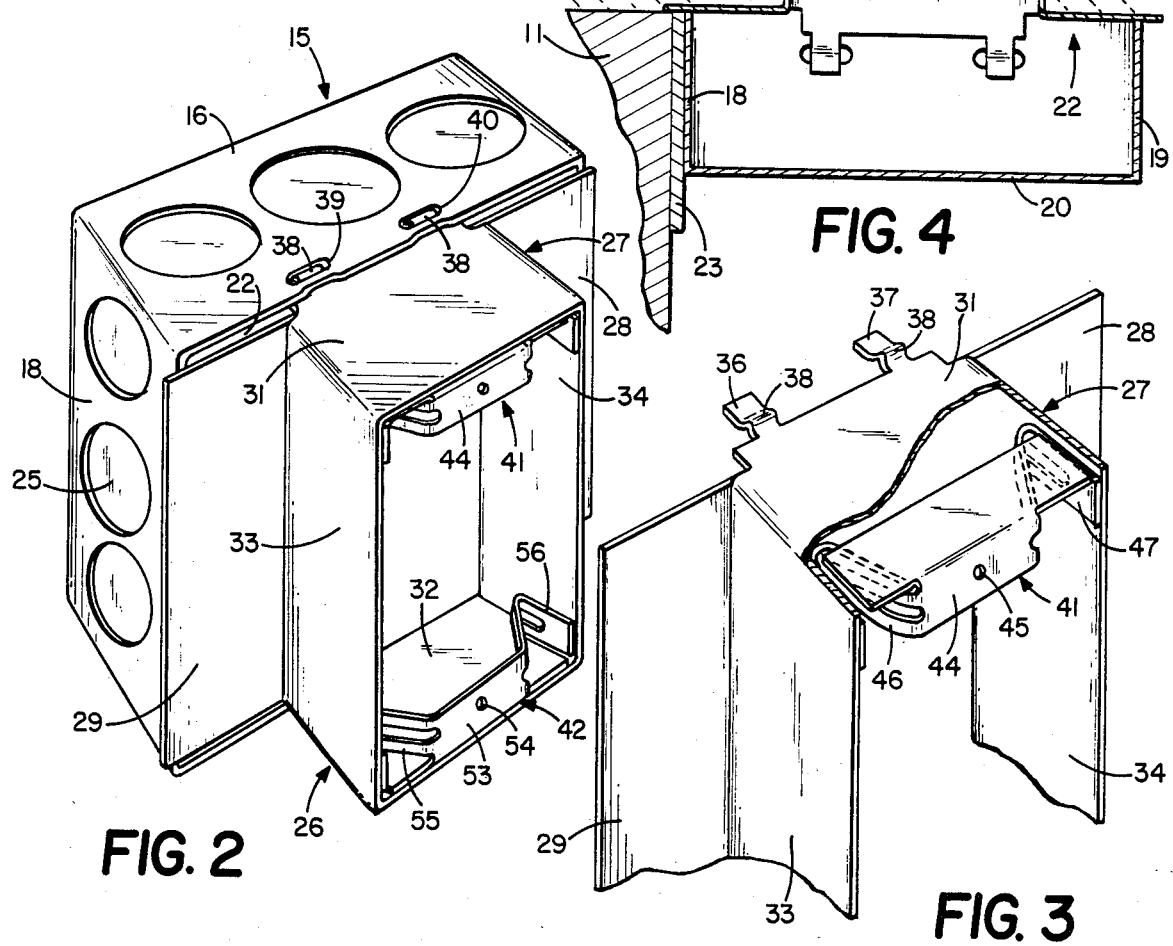

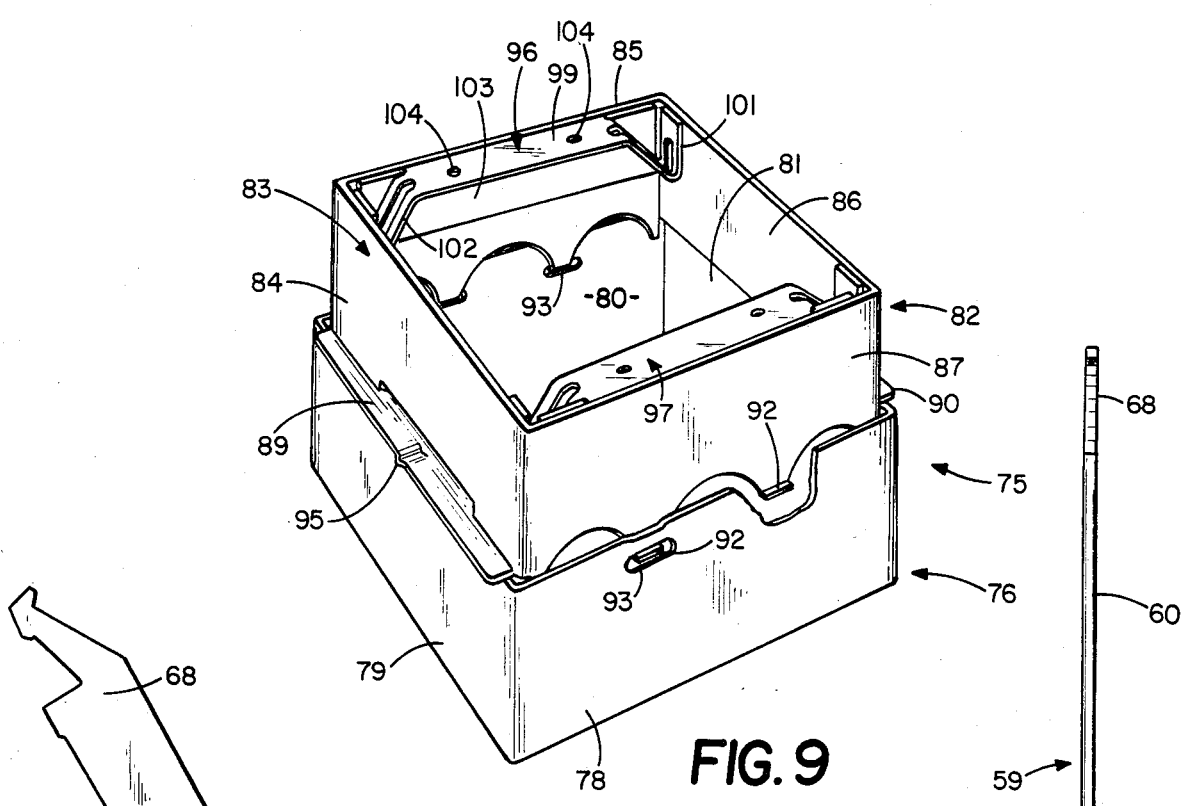
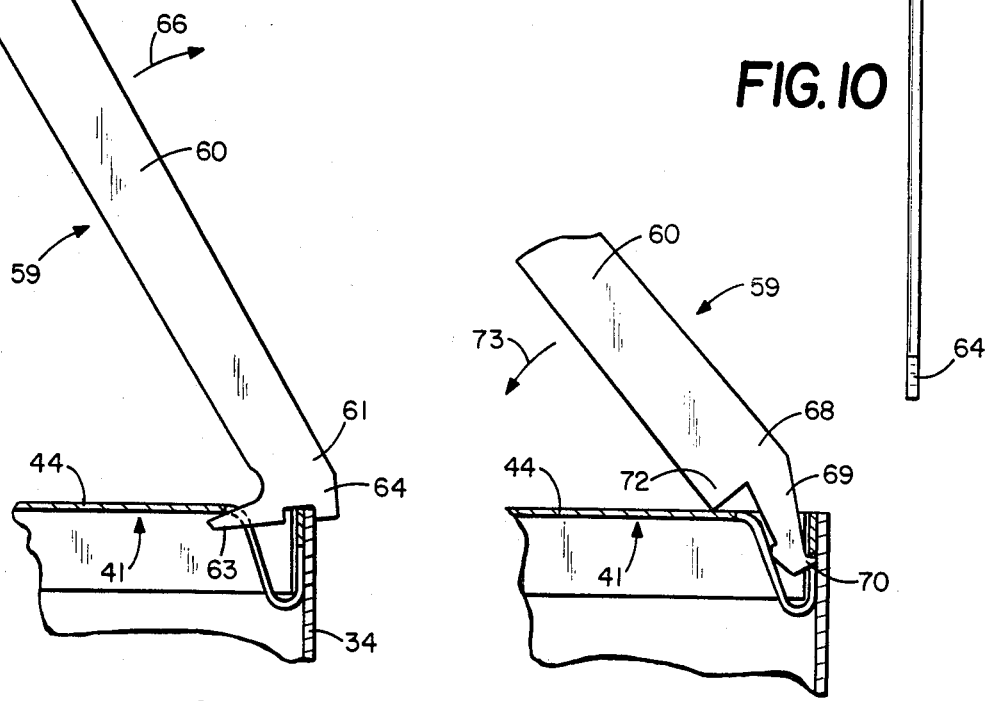

4,599,485

ELECTRICAL RECEPTACLE BOX ASSEMBLY

BACKGROUND OF THE INVENTION

In building construction, electrical receptacle boxes are mounted on upright wall studs, either metal or wood, in order to mount an electrical receptacle, such as an outlet or a switch, and associated electrical conduit and the like. The box can be fixed directly to the stud by nails, screws or other arrangements, or can be fixed on clamping members fastened between adjacent studs. The front plane of the box opening is generally flush with the front surface of the wall studs. A mounting cover or frame is fixed to the recepatacle box, and the receptacle is mounted to the frame. The front of the frame is forwardly offset from the front face of the box in order to accommodate the thickness of wallboard to be installed on the wall studs whereby the receptacle will be generally flush with the outer surface of the wallboard. Such a frame is sometimes caled a mounting ring or mud ring.

Difficulty is frequently encountered in correctly positioning the receptacle box and mounting frame whereby the electrical receptacle is properly flush with the wallboard or construction panel when mounted on the wall studs. Vagaries of the various box-mounting methods may leave the front face of the box slightly askew or depressed with respect to the intended planar surface of the erected wall. The wall stud itself may be slightly askew producing the same result. This necessitates compensation through the use of shims or other undesirable contrivances to attempt to bring the electrical receptacle into proper flush relation with the exposed surface of the erected wallboard.

SUMMARY OF THE INVENTION

The invention pertains to an electrical receptacle box assembly which enables proper flush mounting of an electrical receptacle with respect to the exposed surface of wallboard or construction panel or the like wall structure by permitting adjustment of mounting brackets which hold the electrical receptacle with respect to the mounting frame attached to the electrical box. The assembly includes an electrical receptacle box which has an open front for containing electrical conduit or the like, mountable on an upright wall stud or other suitable structure. A cover spans on and off of the open front of the box by means of slightly resilient clip members which engage slots on the box side wall. The cover includes flange members which abut edges of the box side walls, and an offset mounting frame for mounting an electrical receptacle in forwardly spaced relationship from the plane of the box front opening to allow for the thickness of the wallboard. Mounting brackets are fixed to the mounting frame. The mounting brackets carry the electrical receptacle and are positionally adjustable with respect to the frame in order to closely adjust the position of the eletrical receptacle in flush relationship with the wall surface. Arms which mount the mounting bracket to the mounting frame are bendable in order to permit the desired compensatory adjustment. A pry tool is usuable to accomplish adjustment of the position of the mounting brackets.

IN THE DRAWINGS

FIG. 1 is a front elevational view of an electrical receptacle box assembly according to one form of the invention carrying an electrical switch and mounted on an upright wall stud;

FIG. 2 is a view in perspective of the electrical receptacle box assembly of FIG. 1;

FIG. 3 is an enlarged fragmentary view of a portion of the cover of the electrcial receptacle box assembly of FIG. 2;

FIG. 4 is a sectional view of the electrical receptacle box assembly of FIG. 1 taken along the line 4—4 thereof;

FIG. 5 is an end view of mounting bracket of the electrical receptacle box assemby;

FIG. 6 is a plan view of a metal stamping usuable to form a bracket like that of FIG. 5;

FIG. 7 shows a pry tool in use to make an outward positional adjustment of the mounting bracket of the electrical receptacle box of the invention;

FIG. 8 shows the use of the pry tool of FIG. 7 to make an inward positional adjustment of the bracket;

FIG. 9 is a view in section and partially fragmented of an electrical receptacle box according to another form of the invention; and FIG. 10 is an end view of the pry tool of FIG. 7.

DESCRIPTION OF PREFERRED EMBODIMENTS

Referring to the drawings, there is shown in FIGS. 1-4 an electrical receptacle box assembly indicated generally at 10 mounted on a generally upright wall stud 11, which can be a wooden, channel-shaped metal, or other suitable variety as is commonly used in building construction. FIG. 1 shows a single switch 12 mounted on box assembly 10 preparatory to installation of wallboard or other wall covering, and FIG. 4 shows a wall covering 14 in phantom having been installed with respect to wall stud 11 in conventional fashion.

Receptacle box assembly 10 includes a somewhat conventional electrical receptacle box 15 having upper and lower side walls 16,17 connected to lateral side walls 18, 19, all connected to a back wall 20. Box 15 forms a square configuration, although it could as well be rectangular, round or other desirable configuration. Forward edges of the box side walls 16–19 form an open front 22 accessible to the electrician for installation of conduit, electrical devices and such. Knock-out members 25 can be provided to facilitate such mounting. A mounting plate 23 is securely fastened to one of the lateral side walls 18 and extends above and below the box 15. Fastening members, such as screws 24, are used to fasten the mounting plate 23 and accordingly, box 15 to the upright wall stud 11.

A snap-on cover 26 closes the front opening 22 and carries adjustable mounting means for mounting an electrical receptacle. Cover 26 includes an open frame 27 for offset mounting of an electrical receptacle with respect to front opening 22 of box 15, and base or flange members 28, 29 extended from the inward sides of frame 27 to cover the remaining portion of opening 22 not occupied by frame 27. Mounting frame 27 includes top and bottom walls 31, 32 and side walss 33, 34 disposed generally in parallel relationship to the side walls of the box 15 and define a forwardly offset frame mounting opening. The height of the frame 27, generally determined by the length of side walls 33, 34, corresponds generally to the height of box 15, whereas the width of frame 27 is somewhat less than the width of box 15. Flange member 29 extends from the side wall 33 to the forward edge of lateral side wall 18 of box 15. Opposite flange member 28 extends from the inward edge of side wall 34, frame 27 to the forward edge of the lateral side wall 19 of box 15. Flange members 28, 29 cover the space of front opening 22 not covered by frame 27 and confront the forward edges of the respective side walls of box 15. Flange members 28, 29 extend in substantially perpendicualr relationship to the side walls of frame 27.

Cover 26 is releasably secured to box 15 by clip assemblies having upper and lower pairs of clip members or prongs extended from cover 26 and engageable with lateral mounting slots provided on box 15. As shown in FIG. 3, an upper or first pair of clip members 36, 37 extend rearwardly from the rear edge of the top wall 31 of frame 27. The clip members 36, 37 are slightly resilient and generally linear members having intermediate bends or projections 38 facing upwardly. Symmetrical lower clip members are provided rearwardly extended from the lower wall 32 of frame 27, as is partially shown in FIG. 1. Top side wall 16 of box 15 has transverse slots 39, 40 spaced inward from the front edge thereof positioned for receipt of the projections 38 of the clip elements 36, 37 on the cover 26. Corresponding transverse mounting slots are provided in the lower side wall of box 15. As can be seen in FIG. 2, the edge portions of top wall 16 directly forward of the mounting slots 39, 40 are slightly raised forming slight lips for guidance of the members or prongs 36, 37 to a position with the projections 38 engaged in the slots 39, 40. Cover 26 is inserted into box 15 by alignment of the clip members 36, 37 with the longitudinal slots 39, 40 and pushing the cover inward with resultant deflection of both clip members 36, 37 and the forward edge of the top side wall 16 until the projections 38 are seated in the corresponding slots. The lower clip members are similarly seated in lower slots (not shown). Cover 26 is removable from box 15 by insertion of a flat tool between the top side wall 16 of box 15 and the upper surface of top wall 31 of frame 27 and twisting it to deflect the corresponding surfaces away from one another to a point where the projections 38 are disengaged from the corresponding slots and the cover can be pulled away.

Adjustable mounting brackets for mounting of electrical receptacle devices comprise a first or upper bracket 41 and a second lower mounting bracket 42. Mounting brackets 41, 42 have bendable arms for in and out movement to positionally adjust the mounting location of an electrical receptacle in order to compensate for misalignment of the wall stud or other irregularity. Mounting brackets 41, 42 are located interiorly of frame 27 toward the upper and lower ends thereof respectively. The brackets are identical as exemplified by bracket 41 shown apart from frame 27 in FIG. 5 and in stamped form in FIG. 6 preparatory to being formed into a bracket configuration. Mounting bracket 41 has a front face 44 with a threaded mounting opening 45. Arms 46, 47 extend from either lateral side of the front face 44 and are provided with elongate interior slots 48 to facilitate bending. A short neck 50 extends from face 44 in perpendicular relationship from the arms 46, 47 to a lateral shoulder 51. In the formed configuration of FIG. 5, the shoulder 51 is bent at the neck 50 to be disposed at a right angle to the front face 44. The arms 46, 47 are intermediately bent inwardly to form outwardly open loops. The outer ends of the arms 46, 47 are perpendicular to both the front face 44 and the shoulder 51. As shown in FIG. 3, the bracket 41 is installed inside the frame 27 with the ends of the arms 46, 47 in bearing relationship to the side walls 33, 34 of frame 27. The tips of arms 46, 47 are secured to the side walls by suitable means, such as welding, in alignment with front face 44. The loops formed by the arms 46, 47 are readily deformable in order that the face 44 can be moved inward, outward or positioned at an angle as may be necessay to compensate for wall stud irregularities. The shoulder 51 bears against the interior surface of upper wall 31 of frame 27 and slides with respect to it upon movement of the face 44. Bracket 41 is formed ofa pliable metal whereby face 44 will remain in the corrected position. As shown in FIG. 2, the lower bracket 42 has an identical face 53 with the threaded mounting hole 54 and loop-forming arms 55, 56 with outer ends fixed to the interior surfaces of the side walls 33, 34 of frame 27. The mounting holes 45, 54 are spaced apart a standard dimension, such that a standard switch 12 can be mounted by means of screws 58 in the usual fashion.

Movement of the mounting faces 44, 53 to the desired position can be accomplished through the use of conventional tools, such as pliers or the like. Alternatively, referring to FIGS. 7 and 8, a special pry tool indicated at 59 can be provided for making the desired adjustments. One end of pry tool 59 is formed particularly for outward positional adjustment of face 44, and the other for inward adjustment. Pry tool 59 is shown in FIG. 7 working on bracket 41 to move a portion of the face 44 in an outward direction, and in FIG. 8, to move a portion of the face 44 in an inward direction. Pry tool 59 has an elongate central body portion 60 and a foot 61 at a first end thereof usuable to move the face 44 outward (FIG. 7). Foot 61 has a toe 63 insertable in the end of slot 48 of arm 47 to rest just beneath the edge of the mounting face 44. Foot 61 has a heel 64 which bears against the outer edge of the arm 47 and side wall 34 of frame 27 when the tow 63 is inserted through the slot 48 to bear on the interior surface of face 44. When so engaged as shown in FIG. 7, rotation of the tool in the direction of the arrow 66, or clockwise as viewed in FIG. 7, results in outward movement of that side of the mounting face 44 by bending of the arm 47. Body portion 60 is positioned to extend over the front face of the electrical box when foot 61 is in working relationship with respect to bracket 41 to avoid interference with adjacent wallboard.

As shown in FIG. 8, tool 59 has a second working end 68 configured for engagement with bracket 41 to move the adjacent portion of face 44 inward with respect to frame 27. An arm 69 extends from the end 68 and terminates in an outwardly extended finger 70. Arm 69 is positionable in the loop of bracket arm 47 so that finger 70 can be placed in the end slot to bear against the interior end of the slot. When so positioned, a shoulder 72 is poised over the outward surface of face 44. Rotation of the body portion 60 in direction of arrow 73 is effective to urge the shoulder 72 against the face 44 to movie it inwardly with respect to the frame 27. Through the use of tool 59, either one or both ends of the face 44 can be moved inwardly or outwardly as may be necessary in order to compensate for irregular positioning of the box 15 with respect to a wall stud. In the event that the box 15 is correctly positioned already, no adjustment will be necessary and the faces 44 of the brackets 41, 42 will be properly positioned in flush relationship with respect to frame 27 such that an electrical outlet 12 mounted thereto will be positioned for proer installation of wallboard 14.

A further form of electrical receptacle box assembly indicated generally at 75 is shown in FIG. 9 and is of a configuration for conventional mounting of a pair of electrical receptacles. An electrical receptacle box 76 includes perpendicularly orientated side walls 78-81 defining a front opening for receipt of various equipment. A cover 82 includes a frame 83 having frame side walls 84-87 disposed in generally parallel relationship to the side walls of the box 76 providing an offset mounting area for electrical receptacles. The height of frame 83 generally corresponds to that of the box 76 and the width is only slightly less. Base or flange members 89, 90 extend from rearward or inward edges of side walls 84, 86 laterally outward to cover the front portion of the box opening not encompassed by the frame 84 and confront corresponding edges of the side walls 79, 81 of the electrical receptacle box 76.

Cover 82 is removably assembled to the electrical receptacle box 76. Slightly resilient clip members extend rearwardly from the scalloped rear edges of top and bottom walls 85, 87 and are comprised of outwardly bent projections or fingers. Corresponding slots 93 are formed in the corresponding walls 78, 80 of the box 76 spaced rearwardly from the front edge thereof. The edge portions directly forward of the slots are outwardly bent to form guiding lips for the clip members 92. In use to attach the cover 82 to the box 76, one pair of clip members 92 are inserted in corresponding lateral slots 93. The other pair is rotated into position, being guided by the upwardly turned lips forward of the slots, and is pressed into place against spring force accompanying the deflection of both the side wall of the box and the corresponding clip members. Each flange member has a rearwardly facing intermediate rib 95 abutting the adjacent edge of the box side wall. With the clip members 92 positioned in the slots 93, tension is supplied by the ribs 95 to secure cover 82 and prevent movement thereof.

Frame 83 carries a pair of elongate mounting brackets 96, 97, identical in construction and mounted at opposite ends of cover 82. Bracket 96 has a front mounting face 99 disposed generally in coplanar relationship with the front opening formed by the forward edges of the side walls of frame 83. Lateral arms 101, 102 extend from the lateral ends of the mounting face 99 and have extremities that are interiorly fastened to the interior of corresponding side walls 84, 86 of the frame 83. The arms have elongate slots to facilitate bending. A shoulder 103 extends at a right angle from the mounting face 99 in sliding relationship to the interior surface of the top wall 85 of frame 83. Mounting holes 104 are provided in the mounting face 99 for mounting of electrical receptacles. The lateral ends of the mounting face 99 can be positionally adjusted by bending of the bracket arms 101, 102 as previously described in order to compensate for mounting irregularities of the box 76. Pry tool 59 can be used for this purpose as earlier described. Bracket 97 is identical in construction and can also be positionally adjusted. Mounting brackets 96, 97 are of a width such that a pair of electrical receptacles can be mounted thereon in side-by-side relationship. Electrical receptacle box 76 can be equipped with a mounting plate like that earlier described in order that it can be affixed to an upright wall stud.

While certain preferred embodiments of the invention have been shown and described, it will be apparent that certain deviations can be had without departing from the scope and spirit of the invention.

The embodiments of the invention in which an exclusive property or priviledge is claimed are defined as follows:

1. An electrical receptacle box assembly for positionally adjustable offset mounting of an electrical receptacle, comprising:
   an electrical receptacle box fixable to a all stud and having side walls defining a front opening;
   a cover mounted on the electrical receptacle box in covering relationship to the front opening, said cover having an open frame extended forward of the front opening of the box for offset mounting of an electrical receptacle;
   said frame carrying first and second spaced-apart brackets forwardly offset from the front opening of the box, said first bracket having a front mounting face for mounting a first portion of an electrical receptacle, and first and second oppositely extended lateral bendable arms, each of said arms having an inward loop and an outer end fixed to the frame, said second bracket having a front mounting face for mounting a second portion of an electrical receptacle, and first and second lateral oppositely extended lateral bendable arms, each of said arms having an inward loop and an outer end fixed to the frame, wherein the first and second arms of the first and second brackets are bendable to adjust the position of the mounting face of the first and second brackets to positionally adjust an electrical receptacle mounted on the brackets with respect to the box.

2. The electrical receptacle box assembly of claim 1 wherein: the first and second arms of the first and second brackets each have an elongate slot to facilitate bending of the arm for movement of the face of the brackets.

3. The electrical receptacle box assembly of claim 2 including: a first shoulder attached to the mounting face of the first bracket and disposed in perpendicular relationship to it and positioned for sliding movement with respect to a wall of the frame, and a second shoulder connected to the front face of the second bracket disposed in perpendicular relationship to it and positioned for sliding movement with respect to another wall of the frame.

4. The electrical receptacle box assembly of claim 3 wherein: said mounting faces of the first and second brackets have threaded mounting holes for screw mount of electrical receptacles.

5. The electrical receptacle box assembly of claim 1 wherein: said cover includes flange members extended from the frame in covering relationship to the portion of the front opening of the electrical receptacle box uncovered by the frame.

6. The electrical receptacle box assembly of claim 5 incuding: releasable fastening means connecting the cover to the electrical receptacle box.

7. The electrical receptacle box assembly of claim 6 wherein: releasable fastening means includes a first pair of clip members disposed on one wall of the frame, a second pair of clip members disposed on a second opposite wall of the frame, said electrical receptacle box having a first pair of lateral slots on a first wall positioned to accept a portion of the first clip members, and a second pair of lateral slots on a second wall thereof positioned to accept a portion of the second clip members when the cover is mounted in covering relationship to the front opening of the electrical receptacle box.

8. The electrical receptacle box assembly of claim 1 wherein: said box has first and second parallel side walls with forward edges partially defining the box front opening, said frame has first and second parallel walls with rear edges in abutting relationship to portions of the front edges of the first and second side walls of the box when the cover is in covering relationship to the front opening of the box, and releasable fastening means on the first and second side walls of the box and frame securing the cover to the box.

9. The electrical receptacle box assembly of claim 8 wherein: releasable fastening means includes a first resilient clip member extended rearwardly from the first wall of the frame extendible into the front opening of the box, a first transverse mounting slot located on the first wall of the box spaced slightly rearward from the forward edge thereof, said clip member having a projection insertable in the first slot when the cover is in covering relationship to the front opening of the box; a second clip member extended rearwardly from the second wall of the frame extendible into the front opening of the box, a second transverse mounting slot located on the second wall of the box spaced slightly rearward from the front edge thereof, said second clip member having a projection insertable in the second slot when the cover is in covering relationship to the front opening of the box.

10. The electrical receptacle box assembly of claim 8 wherein: said releasable fastening means includes a first pair of resilient clip members extended rearwardly from the first wall of the frame extendible into the box opening, a first pair of transverse mounting slots located on the first wall of the box spaced rearward from the front edge, said first pair of clip members having projections releasably insertable in the first transverse slots when the cover is in covering relationship to the front opening of the box; a second pair of resilient clip members extended rearwardly from the second wall of the frame extendible into the box opening, a second pair of transverse mounting slots located on the second wall of the box spaced rearward from the front edge thereof, said second clip members having projections releasably insertable in the second slots when the cover is in covering relationship to the front opening of the box.

11. The electrical receptacle box assembly of claim 10 wherein: said first side wall of the box has raised portions along the front edge thereof forward of the first pair of transverse slots for guiding the first clip members, and said second side wall of the box has raised portions forward of the second slots for guiding the second pair of clip members.

12. The electrical receptacle box assembly of claim 10 wherein: the first and second arms of the first and second brackets each have an elongate slot to facilitate bending of the arm for movement of the face of the brackets.

13. An electrical receptacle box assembly for positionally adjustable offset mounting of an electrical receptacle, comprising:

an electrical receptacle box having first, second, third and fourth perpendicularly orientated side walls with front edges forming a front opening;

a cover mountable on the box in covering relationship to the front opening of the box;

said cover having first, second, third and fourth cover side walls forming a frame, said side walls being generally parallel to the side walls of the box and having front edges defining an offset mounting opening for an electrical receptacle;

a first mounting bracket having a mounting face and a pair of laterally extended arms, said mounting face being disposed proximate said mounting opening of the frame near the second frame side wall, the first and second arms of the first mounting bracket having inwardly formed loops and outward ends secured to the first and third walls of the frame respectively; a second mounting bracket having a mounting face disposed proximate the mounting opening of the frame near the fourth frame side wall and having first and second laterally extended arms, said first and second arms having inwardly formed loops and outer ends attached to the first and third frame side walls, said mounting faces being adapted for mounting portions of an electrical receptacle, said first and second mounting arms of the mounting brackets being individually bendable to positionally adjust the electrical receptacle with respect to the mounting opening of the frame.

14. The electrcial receptacle box assembly of claim 13 including: flange members attached to the inward edges of the frame side walls to cover the portions of the front opening of the box uncovered by the frame portion of the cover.

15. The electrical receptacle box assembly of claim 14 wherein: said first and second arms of the first and second brackets each have an elongate slot to facilitate bending of the arm for movement of the face of the brackets.

16. An electrical receptacle box assembly with a removable cover, comprising:

an electrical receptacle box fixable to a wall stud and having side walls defining a front opening;

a cover releasably mounted on the electrical receptacle box in covering relationship to the front opening, said cover having an open frame extended forward of the front opening of the box for offset mounting of an electrical receptacle;

releasable fastening means connecting the cover to the electrical receptacle box including a first pair of clip members disposed on one wall of the frame, a second pair of clip members disposed on a seond opposite wall of the frame, said electrical receptacle box having a first pair of lateral slots on a first wall positioned to accept a portion of the first clip members, and a second pair of lateral slots on a second wall thereof positioned to accept a portion of the second clip members when the cover is mounted in covering relationship to the front opening of the electrical receptacle box.

* * * * *

UNITED STATES PATENT AND TRADEMARK OFFICE
CERTIFICATE OF CORRECTION

PATENT NO. : 4,599,485
DATED : July 8, 1986
INVENTOR(S) : Robert A. Smolik

It is certified that error appears in the above-identified patent and that said Letters Patent is hereby corrected as shown below:

Column 1, line 14, "recepatacle" should be -- receptacle --.

Column 1, line 21, "caled" should be -- called --.

Column 1, line 48, "spans" should be -- snaps --.

Column 1, line 59, "eletrical" should be -- electrical --.

Column 1, line 63, "usuable" should be -- usable --.

Column 2, line 6, "electrcial" should be -- electrical --.

Column 2, line 13, "usuable" should be -- usable --.

Column 2, line 60, "walss" should be -- walls --.

Column 3, line 7, "perpendicualr" should be -- perpendicular --.

Column 3, line 44, after "second" insert -- or --.

Column 4, line 6, "necessay" should be -- necessary --.

Column 4, line 32, "usuable" should be -- usable --.

Column 4, line 53, after "end" insert -- of the --.

Column 4, line 58, "movie" should be -- move --.

Column 4, line 67, "positioned" should be -- in position --.

Column 4, line 67, "proer" should be -- proper --.

UNITED STATES PATENT AND TRADEMARK OFFICE
CERTIFICATE OF CORRECTION

PATENT NO. : 4,599,485

DATED : July 8, 1986

INVENTOR(S) : Robert A. Smolik

It is certified that error appears in the above-identified patent and that said Letters Patent is hereby corrected as shown below:

Column 6, line 2, "priviledge" should be -- privilege --.

Column 6, line 7, "all" should be -- wall --.

Column 6, line 28, "face" should be -- faces --.

Column 6, line 56, "incuding" should be -- including --.

Column 8, line 31, "electrcial" should be -- electrical --.

Column 8, line 37, "said" should be -- the --.

Column 8, line 53, "seond", in the second instance, should be -- second --.

Signed and Sealed this

Twenty-first Day of October, 1986

[SEAL]

Attest:

DONALD J. QUIGG

Attesting Officer   Commissioner of Patents and Trademarks